US012585624B2

(12) United States Patent 
Manhart et al.

(10) Patent No.: US 12,585,624 B2 
(45) Date of Patent: Mar. 24, 2026

(54) COMPUTER-IMPLEMENTED METHOD FOR PROVIDING AN OUTPUT DATA SET, METHOD FOR DETERMINING STATISTICAL INFORMATION, APPARATUS, COMPUTER PROGRAM AND DATA MEDIUM

(71) Applicant: Siemens Healthineers AG, Forchheim (DE)

(72) Inventors: Michael Manhart, Fürth (DE); Alexander Preuhs, Erlangen (DE); Manuela Meier, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 18/620,101

(22) Filed: Mar. 28, 2024

(65) Prior Publication Data 
US 2024/0330255 A1 Oct. 3, 2024

(30) Foreign Application Priority Data 
Mar. 31, 2023 (EP) .................................... 23165842

(51) Int. Cl. 
*G06F 16/215* (2019.01) 
*G06F 16/55* (2019.01) 
(52) U.S. Cl. 
CPC ............ *G06F 16/215* (2019.01); *G06F 16/55* (2019.01)
(58) Field of Classification Search 
None 
See application file for complete search history.

(56) References Cited

U.S. PATENT DOCUMENTS 6,381,339 B1 * 4/2002 Brown .................... G06V 40/19 
382/103 
10,382,373 B1 * 8/2019 Yang ........................ H04W 4/18 
(Continued)

FOREIGN PATENT DOCUMENTS

DE 3719750 A1 * 3/2019 ........... G06T 11/001 
DE 102020216017 A1 6/2022

OTHER PUBLICATIONS

Medical Imaging Artifact Correction (Year: 2019).* 
(Continued)

*Primary Examiner* — Hosain T Alam 
(74) *Attorney, Agent, or Firm* — Lempia Summerfield Katz LLC

(57) ABSTRACT

Systems and methods for image processing that provides an output data set on the basis of an input data set relating to an examination subject. The method includes generating an initial intermediate data set group from a plurality of intermediate data sets by applying a respective correction operation associated with the respective intermediate data set to the input data set, ordering the intermediate data sets according to a quality ranking in respect of their image quality by a sorting algorithm, wherein the intermediate data sets of the initial intermediate data set group are ordered in a first iteration, wherein, in the sorting algorithm, a respective relative quality metric for the relative image quality of a respective first of the intermediate data sets in relation to a respective second of the intermediate data sets is determined by a comparison algorithm, after which the order of the respective first and second intermediate data set in the quality ranking is specified by a comparison of the relative quality metric with a quality limit value.

14 Claims, 5 Drawing Sheets

(56) References Cited

U.S. PATENT DOCUMENTS

| | | | |
|---|---|---|---|
| 2013/0243293 A1* | 9/2013 | Dennerlein | ........... G06T 11/008 |
| | | | 382/131 |
| 2018/0315225 A1* | 11/2018 | Zhang | ........................ G06T 5/60 |
| 2019/0026866 A1* | 1/2019 | Takeshima | ................ G06T 5/50 |
| 2021/0232931 A1* | 7/2021 | Speakman | ........... G06T 19/006 |
| 2022/0189013 A1 | 6/2022 | Manhart | |

OTHER PUBLICATIONS

Herbst, Magdalena, et al. "Misalignment compensation for ultra-high-resolution and fast CBCT acquisitions." Medical Imaging 2019: Physics of Medical Imaging. vol. 10948. SPIE, 2019. pp. 1-7.
Preuhs, Alexander, et al. "Deep autofocus with cone-beam CT consistency constraint." Pattern Recognition Lab, Friedrich-Alexander-Universität Erlangen-Nurnberg. Dec. 2, 2019. pp. 1-6.
Preuhs, Alexander, et al. "Image quality assessment for rigid motion compensation." arXiv preprint arXiv:1910.04254 (2019). pp. 1-4.
Shah, Nihar B., and Martin J. Wainwright. "Simple, robust and optimal ranking from pairwise comparisons." Journal of machine learning research 18.199 (2018): 1-38.

* cited by examiner

COMPUTER-IMPLEMENTED METHOD FOR PROVIDING AN OUTPUT DATA SET, METHOD FOR DETERMINING STATISTICAL INFORMATION, APPARATUS, COMPUTER PROGRAM AND DATA MEDIUM

CROSS REFERENCE TO RELATED APPLICATIONS

This application claims the benefit of EP 23165842.8 filed on Mar. 31, 2023, which is hereby incorporated by reference in its entirety.

FIELD

Embodiments relate to a computer-implemented method for providing an output data set on the basis of an input data set relating to an examination subject.

BACKGROUND

In the field of image data processing, for example in the field of medical image data processing, different image qualities may result due to different parameterizations of the image data processing operation, for example of a reconstruction of three-dimensional image data from projection images in X-ray imaging.

An important area of image quality improvement is artifact reduction. For example, it is possible by a suitable image data processing method to compensate at least to some extent for metal and beam hardening artifacts in X-ray imaging. In a three-dimensional X-ray imaging process, a three-dimensional image data set is reconstructed from a plurality of projection images. As a result of a movement of the examination subject or other movements, due for example to a vibration of the X-ray detector, motion artifacts, for example a blurring or a formation of ghost images, may also occur, that may be compensated for or at least reduced by suitable image data processing techniques.

A possible approach to this are techniques known as autofocus methods, in which a motion model is determined in the course of the reconstruction by optimizing an image quality metric, for example a grayscale value histogram entropy or the total variation. Reference is made in this regard by way of example to the publication by M. Herbst et al., "Misalignment Compensation for Ultra-High Resolution and Fast CBCT Acquisitions", Proc SPIE, vol. 10948, pp. 406-412 412, 2019.

Since such image quality metrics may have local minima, the publication by A. Preuhs et al., "Image Quality Assessment for Rigid Motion Compensation", MedNeurIPS, 2019 proposes instead to estimate the quality of the reconstructed image data with the aid of an algorithm trained by machine learning, that calculates a measure for the reprojection error.

Since a trained function that is intended to determine an absolute measure for the image quality, for example a reprojection error, has a high degree of complexity and consequently a comprehensive and time-consuming training with extensive training data is necessary, the publication DE 10 2020 216 017 A1 proposes instead to directly compare two intermediate data sets provided by different corrections with one another and thus determine a relative image quality metric or an ordering of the compared intermediate data sets in respect of their relative image quality. This may be implemented as a trained function by an "ordinal network". However, in certain cases, for example in order to compensate for motion artifacts caused by relatively large movements, the use of the relative image quality may lead to only a local quality optimum being achieved.

BRIEF DESCRIPTION AND SUMMARY

The scope of the present disclosure is defined solely by the claims and is not affected to any degree by the statements within this summary. The present embodiments may obviate one or more of the drawbacks or limitations in the related art. Independent of the grammatical term usage, individuals with male, female or other gender identities are included within the term.

Embodiments provide image processing that is improved by comparison therewith, wherein in spite of using relative image qualities it is aimed for example to reduce the probability of achieving solely a local quality optimum.

A computer-implemented method provides an output data set on the basis of an input data set relating to an examination subject. The method including the following steps: receiving the input data set, generating an initial intermediate data set group from a plurality of intermediate data sets by applying a respective correction operation associated with the respective intermediate data set to the input data set, ordering the intermediate data sets according to a quality ranking in respect of their image quality by a sorting algorithm, wherein the intermediate data sets of the initial intermediate data set group are ordered in a first iteration, wherein, in the sorting algorithm, a respective relative quality metric for the relative image quality of a respective first of the intermediate data sets in relation to a respective second of the intermediate data sets is determined by a comparison algorithm, after which the order of the respective first and second intermediate data set in the quality ranking is specified by a comparison of the relative quality metric with a quality limit value, wherein if an abort condition is met, one of the intermediate data sets is selected as a function of the quality ranking and at least one correction parameter that parameterizes a correction algorithm in order to provide the correction operation associated with the selected intermediate data set and/or the selected intermediate data set are provided as the output data set, and wherein if the abort condition is not met, a modified intermediate data set group is formed that includes at least one intermediate data set that is generated by applying a respective correction operation dependent on the quality ranking to the input data set, after which, in a further iteration, the ordering of the intermediate data sets and the evaluation of the abort condition for the modified intermediate data set group are repeated, wherein, on the one hand, quality limit values different from one another are used in at least two of the iterations in the sorting algorithm and/or wherein, on the other hand, the quality limit value is specified in at least one of the iterations as a function of the input data set and/or of acquisition information relating to at least one characteristic of the acquisition of the input data set.

In the method, it is aimed to achieve by the iteration for example an approximation to an optimal correction of the input data set or of an image data set determined from the input data set. As the output data set, the selected intermediate data set may be immediately provided as the image data set. Since the intermediate data sets are ordered according to their image quality, given a quality ranking in descending order, for example, the first intermediate data set may be used directly as the selected intermediate data set.

In addition, or alternatively to the output of the selected intermediate data set, it may be advantageous to provide the at least one correction parameter that was used for providing the intermediate data set or the associated correction operation as part of the output data set. This may serve for example to separate the determination of correction parameters, i.e. for example of parameters of an artifact model or motion model, from the image data processing, i.e. for example from an image reconstruction.

As a downstream method step, or also after the end of the method in a method step lying outside of the method downstream of the end of the method, an image data processing operation may then be performed that generates a corrected image data set from the input data set using the at least one correction parameter. For example, both the correction operation used in the method and the downstream image data processing may include a reconstruction of three-dimensional image data from two-dimensional image data, for example from projection image. The same correction parameters are used for providing the selected intermediate data set and the corrected image data, though these operations differ from one another in respect of other parameters, for example in respect of the voxel size used and/or the smoothing parameters.

Since the relative image quality determined in the pairwise comparison of the intermediate data sets may be susceptible to errors, a first intermediate data set that actually possesses a better image quality than the second intermediate data set of the pair may not be recognized as such in individual cases. This is equivalent to a false negative identification. Furthermore, a first intermediate data set that actually possesses a lower image quality than the second intermediate data set compared with it may be identified as being of higher quality. This is equivalent to a false positive identification.

A high false positive rate during the optimization process leads to this not being able to be converged or the actual optimum not being found. By choosing a suitable quality limit value, however, it is possible to reduce the false positive rate, i.e. the frequency of a false positive identification. However, this necessarily leads also to a reduction in the true positive rate, i.e. the frequency with which it is correctly identified if the first intermediate data set actually possesses a better image quality than the second intermediate data set. This reinforces the tendency that only a local optimum may be found instead of a global optimum.

These problems are avoided or at least significantly reduced in the method in that the quality limit value is adjusted between the iterations and/or as a function of the input data set itself or of the acquisition information.

By using different quality limit values for different iterations, it is possible for example initially with high sensitivity, i.e. with a high true positive rate, to sample a large parameter space since there is a higher probability of new corrections or intermediate data sets being classified as being of better quality. For example, the probability that the optimization remains in the region of a local optimum is reduced.

After several iterations or when it is recognized that no further improvement is being achieved with the initially used limit value, the limit value may be changed in such a way that the false positive rate is reduced and consequently for example a robust and rapid convergence is achieved. Instead of a stepwise adjustment after multiple iterations, it is alternatively also possible to choose the limit value afresh for each iteration or the like.

A state in which no further improvement is achieved for a given limit value may be present or be recognized for example when differences between the best and the worst of the intermediate data sets of the current intermediate data set group fall below a limit value or when an alternative quality metric indicates a sufficient quality or no further change in quality.

When there is evidence of more severe artifacts, movements or the like, for example in the case of a low signal-to-noise ratio, unsharp image data and/or strong changes in contrast that may indicate metallic inclusions or similar artifact-causing problems, taking the input data set itself into consideration in the determination of the limit value may for example serve to set the limit value initially such that, for example on account of a high true positive rate, a convergence in an exclusively local optimum is prevented or is at least significantly more improbable than in the case of a limit value with a lower true positive rate.

The same applies if the acquisition information indicates the potential presence of strong sources of interference, for example when the acquisition information points to a strong movement of the examination subject during the acquisition of the input data set and/or to long time intervals between acquisitions of partial data sets. Such information may be taken for example from a measurement protocol or captured by way of additional sensors of an acquisition facility during the acquisition of the input data set.

If, on the other hand, the interference effects are likely to be rather slight, a limit value with a low false positive rate may be used immediately in order to achieve a robust and rapid convergence of the optimization.

The input data set may for example include medical image data. For example, a plurality of projection images of an X-ray facility may be received as input data. However, other two-dimensional or three-dimensional image data may also be processed as the input data set. Apart from the respective correction by the respective correction operation, the intermediate data sets or the output data set may correspond in one case to the input data set, i.e. for example also include two-dimensional image data. In an embodiment, the input data set may include a plurality of two-dimensional images, for example projection images, from which a three-dimensional image is reconstructed, for example within the context of the three-dimensional X-ray imaging.

The input data set may be provided directly by an acquisition facility, for example by a medical imaging facility, read out from a database or the like.

The correction operation may serve for example for artifact reduction, for example for correcting motion artifacts, metal artifacts or artifacts on the basis of high-contrast regions, beam hardening artifacts and/or scatter artifacts. In addition, or alternatively, the correction operations may also include a contrast and/or sharpness optimization.

If, in the course of providing the output data set, a reconstruction of three-dimensional image data from two-dimensional image data is also performed, it is possible in principle for the cited corrections to be applied initially to the two-dimensional image data and for the subsequent reconstruction of the three-dimensional image data to be performed independently of the correction.

For example, when motion artifacts are corrected, it may be advantageous to take into consideration a correction, for example in relation to a relative movement of an acquisition the imaging facility and of the examination subject, during the reconstruction.

Correction algorithms for correcting two-dimensional image data or for a corrected reconstruction are already known per se. However, an optimal correction typically requires a parameterization, for example the specification of a movement path of the examination subject for which the motion is to be corrected.

In the method, the correction operations may therefore be based for example on the same correction algorithm, though this is parameterized with correction parameters different from one another in order to generate the different intermediate data sets so that an optimization of the parameterization of a correction algorithm may be performed in the method. In the course of the optimization, a respective optimized value for the at least one correction parameter may therefore be determined and provided as part of the output data set.

For example, an image quality according to at least one predefined quality criterion or absolute quality metric, i.e. for example in respect of a minimization of motion artifacts and/or other artifacts, is regarded as the image quality.

The optimization of the correction operation, i.e. for example of the at least one correction parameter, or the finding of the optimal intermediate data set may be accomplished for example by a downhill simplex method, also known as the Nelder-Mead method. The downhill simplex method is well-known per se and therefore shall not be explained in detail. In order to optimize the image quality in the respective iteration step, the downhill simplex method requires the intermediate data sets to be sorted in terms of absolute image quality. By using the comparison algorithm and the limit value comparison for the pairwise comparison of the intermediate data sets, it is sufficient for this sorting in the method to determine a relative image quality between two of the intermediate data sets in each case. For example, the sorting may be conducted on the basis of a pairwise comparison by a bubble sort or quick sort algorithm.

The respective quality limit value may be specified for at least one of the iterations as a function of statistical information that describes a relationship of a true positive rate and/or a false positive rate of the determined order of the first and second intermediate data set with respect to the limit value for predefined reference data.

As has already been explained, it may be necessary to use a limit value with a relatively high true positive rate as a function of the number of the already completed iteration steps or of the preceding degree of convergence of the intermediate data sets and/or as a function of characteristics of the input data set or of the acquisition information. In the case of the given comparison algorithm, however, the use of a limit value with a higher true positive rate necessarily leads to an increase in the false positive rate. Owing to the statistical information, the true positive rate and/or the true negative rate may be known for each possible limit value so that a particularly suitable limit value may be chosen on the basis of the statistical information.

For example, a weighted sum from the sensitivity corresponding to the true positive rate and the specificity calculated by subtraction of the false positive rate from one may be maximized, the respective weighting of the sensitivity and the specificity being dependent on whether rather a high specificity, i.e. for example a rapid convergence, or a high sensitivity, that is relevant for example for avoiding the optimizing toward a local minimum, is advantageous for the current iteration step.

The reference data may include one or more groups of intermediate data sets whose quality ranking is known. In one case, the quality ranking may be specified for example based on a manual assessment by one or more experts. However, an automatic arrangement may also be performed. If, for example, a motion correction is to be performed in the explained method, an input data set that is not disrupted by movements may initially be provided by a simulation or a data acquisition under controlled conditions. An input data set resulting from a known movement as interference may then be determined from this on the basis of a simulation. Thus, the motion that is to be compensated for is completely known and consequently also the optimal correction operation or the optimal value for the at least one correction parameter.

If the correction operation is parameterized for example by the movement path of the examination subject, that is specified for example by the at least one correction parameter, a metric for the error of the correction for example may therefore be introduced, for example a distance metric for the distance between the correct movement path and a movement path assumed for the respective intermediate data set, and the intermediate data sets of the reference data may be ordered on the basis of the distance metric in a predefined quality ranking.

If the quality metric for a first and a second of the intermediate data sets is now determined by the comparison algorithm and subsequently the limit value comparison is performed for a given limit value, a distinction may be made between different cases. In the example, the combination of comparison algorithm and limit value comparison checks whether the image quality of the first intermediate data set is greater than the image quality of the second intermediate data set. If this is the case, then the comparison result is positive, otherwise it is negative.

If the first intermediate data set is now chosen such that it comes before the second intermediate data set in the quality ranking of the reference data, the higher image quality may be correctly identified, as a result of which the first intermediate data set is also arranged before the second intermediate data set by the sorting algorithm. This result may be designated as a true positive result. An inverse result, i.e. a misidentification, may in this case be regarded as a false negative result.

If, on the other hand, the second intermediate data set is arranged ahead of the first intermediate data set in the quality ranking of the reference data and the same arrangement also results by the sorting algorithm, this may be rated as a true negative result. An incorrect sorting may in this case be regarded as a false positive result.

The sensitivity or the true positive rate may be calculated as the quotient from the number of true positive events and the sum of the numbers of true positive events and false negative events.

The false positive rate may be calculated as the quotient from the number of false positive events and the sum of the numbers of false positive events and true negative events.

Statistical information based on a first and second partial statistic may be used as the statistical information, wherein the first and second partial statistic in each case describe a frequency distribution of the relative quality metrics when the comparison algorithm is applied to pairs of a respective first and second intermediate data set predefined by the reference data, wherein in the case of the first partial statistic the intermediate data sets of the respective pair are selected from the reference data in such a way that the image quality of the first intermediate data set is higher than the image quality of the second intermediate data set, and wherein in the case of the second partial statistic the intermediate data sets of the respective pair are selected from the reference data in such a way that the image quality of the first intermediate data set is lower than the image quality of the second intermediate data set.

The statistical information may be formed in principle directly by both partial statistics. The partial statistics form overlapping distributions, typically two Gaussian curves. For a given limit value, the true positive rate and the false positive rate may be determined directly from these distributions. That part of the distribution of the first partial statistic lying above the limit value describes the number of true positive events and the part of the distribution lying below the limit value describes the number of false negative events. That part of the distribution of the second partial statistic lying above the limit value describes the number of false positive events and the part of the distribution lying below the limit value describes the number of true negative events.

If a trained function is used as a comparison algorithm, as will be discussed in more detail later, training data sets used for training the trained function or parts thereof may be used as reference data.

The statistical information may be or describe a ROC curve that describes the relationship between the true positive rate and the false positive rate. ROC curves (ROC: Receiver Operating Characteristic) are also called limit value optimization curves. They allow a tradeoff between sensitivity and specificity in the choice of the operating point or limit value.

The respective limit value may be chosen in the iterations in such a way that for at least one of the iterations the true positive rate and/or the false positive rate are/is less than in at least one preceding iteration, for example than in all of the preceding iterations. This enables the area of the global minimum to be located, initially with high sensitivity and low specificity, and then the specificity to be increased by adjusting the limit value in order to achieve a convergence of the optimization or to speed up the latter.

The limit value or the false positive rate may be monotonically lowered continuously or step by step, and consequently never be greater for example in a later iteration than in preceding iterations. In addition, or alternatively to the number of the current iteration step, the change of the limit value may also be dependent on the current intermediate data sets. For example, it may be checked in each iteration or in each case after several iterations whether improvements are continuing to be achieved with the currently used limit value for a quality metric determined in some other way, and only when this is no longer the case may the limit value be adjusted. Examples of other relevant quality metrics will be explained later.

The input data set may include a plurality of partial data sets acquired at acquisition times spaced apart from one another with respect to time, wherein the respective correction operation is or includes an at least partial compensation for a respective assumed relative movement between the examination subject and an acquisition means by which the partial data sets were acquired, for example an X-ray detector. By a partial compensation is to be understood for example an exclusive compensation or partial compensation for an unplanned relative movement. For example, an overall relative movement may be an overlaying of a planned relative movement, for example a movement of a C-arm or CT scanner or a patient table, and an unplanned relative movement, for example a patient movement and/or a movement due to mechanical tolerances, vibrations or the like.

If a freedom from motion is assumed or the planned movement is exclusively taken into consideration, motion artifacts, for example ghost images and/or an unsharpness, may result for example during a reconstruction of three-dimensional image data. However, such image interference problems may be avoided or initially reduced by a motion correction that is taken into account for example during the reconstruction but in addition or alternatively may also correct individual images. Appropriate correction methods are known per se. In this case, however, correction parameters must typically be estimated, whereas in the method these may be determined in the course of an iteration or optimization.

The acquisition information may specify a time interval between at least two of the acquisition times and/or a motion metric for a movement of the examination subject, for example detected by sensors, during the acquisition of the input data set, the limit value in at least one of the iterations being specified as a function of the time interval and/or of the motion metric. The time interval may be specified directly or for example indirectly by a measurement sequence used.

The motion metric may be received directly or for example as a path for which subsequently a path length for example may be determined as the motion metric, or as an average speed or the like as part of the acquisition information or be determined from the latter. A sensor-based acquisition may be implemented for example by a distance sensor, a camera, a localization facility arranged on the examination subject or a motion or vibration sensor disposed thereon. For example, the strength of the movement may be evaluated as a motion metric.

If a strong movement is detected or there is a long time interval between acquisition times, a higher sensitivity and consequently a lower specificity is preferably chosen at least for the first iteration than in the case of a slight movement or short time interval.

If a respective acquisition limit value is reached or exceeded by the motion metric and/or by the time interval, the respective quality limit value may be chosen in at least one of the iterations such that the true positive rate and/or the false positive rate are/is greater than for the case in which the respective acquisition limit value is not reached or exceeded. As a result of this choice of the limit value, the risk that the optimization will end in a local minimum may be reduced. For example, such a choice of the limit value may be made for the first iteration or for a plurality of first iterations and subsequent iterations may use a limit value that leads to a lower false positive rate by comparison.

In addition, or alternatively, the limit value may be chosen as a function of the input data set or as a function of image data reconstructed therefrom. For example, a measure for interference or artifacts in the input data set or the reconstructed image data may be determined on the basis of the data and the limit value may be chosen as a function of the measure. If stronger sources of interference or more severe artifacts are detected, the limit value may be chosen such that the true positive rate and/or the false positive rate are/is greater than for the situation in which this is not the case.

The acquisition information may be based at least to some extent on sensor data captured during the acquisition of the input data set and/or on a measurement protocol used for the acquisition of the input data set. The measurement protocol may provide information relating to time intervals of measurements as well as to potential vibrations and the like. Sensor data may be used for example to detect or quantify a movement of the examination subject relative to the acquisition facility used, as already explained above.

For at least one of the iterations, a further, for example absolute, quality metric may be determined by a quality determination algorithm different from the comparison algorithm for at least one of the intermediate data sets of the modified intermediate data set group used in this iteration or in the iteration preceding this iteration, the quality limit value used in this iteration being dependent on the further quality metric. For example, a change to the further quality metric with respect to a previously determined corresponding further quality metric and/or the further quality metric itself may be compared with a predefined limit value. If it is recognized that there is hardly any change in the further quality metric in the course of the iterations or if it is recognized on the basis of the further quality metric that a sufficiently good image quality is present, the limit value may be adjusted in order to achieve a faster convergence of the optimization by increasing the true positive rate and/or in order to ensure that the actual optimum is achieved with the best possible accuracy.

An epipolar consistency and/or a quality of the registration of two-dimensional image data to a reconstructed 3D image may be evaluated for example as a further quality metric. In addition, or alternatively, a grayscale value histogram entropy and/or a total variation for example may be taken into consideration as a further quality metric. Methods for determining the cited further quality metrics are sufficiently known per se in the prior art and shall therefore not be explained in detail.

A function trained by machine learning may be used as a comparison algorithm. For example, supervised training on the basis of predefined training data sets may be performed in this case. Options for obtaining suitable training data sets, for example including intermediate data sets ordered according to their image quality, have already been explained above with regard to the reference data that may be used for determining the statistical information. The training may be conducted for example by minimizing a cost function, for example by backpropagation. The cost function may correspond for example to the cross-entropy or include this, for example as a summand. The training of the trained functions may be fully completed before the above-explained statistical information is determined.

In general, a trained function maps cognitive functions which human beings associate with other human brains. By training based on training data (machine learning), the trained function has the ability to adapt to new circumstances and to detect and extrapolate patterns.

Parameters of a trained function may be adjusted by training. For example, supervised learning, semi-supervised learning, unsupervised learning, reinforcement learning and/ or active learning may be used. In addition, representation learning (also known as "feature learning") may also be used. For example, the parameters of the trained function may be adjusted iteratively by multiple training steps.

A trained function may for example include a neural network, a support vector machine (SVM), a decision tree and/or a Bayesian network, and/or the trained function may be based on k-means clustering, Q-learning, genetic algorithms and/or association rules. For example, a neural network may be a deep neural network, a convolutional neural network (CNN) or a deep CNN. In addition, the neural network may be an adversarial network, a deep adversarial network and/or a generative adversarial network (GAN).

As well as the method for providing an output data set, embodiments provide a computer-implemented method for determining statistical information that is suitable for specifying the respective quality limit value for at least one of the iterations as a function of the statistical information in the method as claimed in one of the preceding claims, wherein a first and a second partial statistic are determined by in each case determining a frequency distribution of the relative quality metrics when the comparison algorithm is applied to pairs of a respective first and second intermediate data set predefined by the reference data, wherein in the case of the first partial statistic the intermediate data sets are selected from the reference data in such a way that the image quality of the first intermediate data set is higher than the image quality of the second image data set, and wherein in the case of the second partial statistic the intermediate data sets are selected from the reference data in such a way that the image quality of the first intermediate data set is lower than the image quality of the second image data set, after which the statistical information is provided as a function of the first and second partial statistics. Further possible embodiments and features of the method for determining the statistical information have already been explained above and may be used in the method with the advantages cited there. For example, as has likewise already been explained above, an ROC curve may be determined as statistical information.

Embodiments also provide an apparatus including an input interface via which an input data set may be received, an output interface via which an output data set may be provided, and a processing facility, the processing facility being configured to perform the computer-implemented method for providing an output data set and/or the computer-implemented method for determining statistical information. The features explained above in relation to the methods may be applied to the apparatus with the advantages cited there, and vice versa.

Embodiments further provide a computer program including instructions that are configured to perform the computer-implemented method for providing an output data set and/or the computer-implemented method for determining statistical information when the instructions are executed on a processing facility.

Embodiments further provide a data medium including a computer program.

Features that have been explained in relation to the individual methods or subject matters may also be applied to the respective other subject matters with the cited advantages.

DETAILED DESCRIPTION

Figure 1:
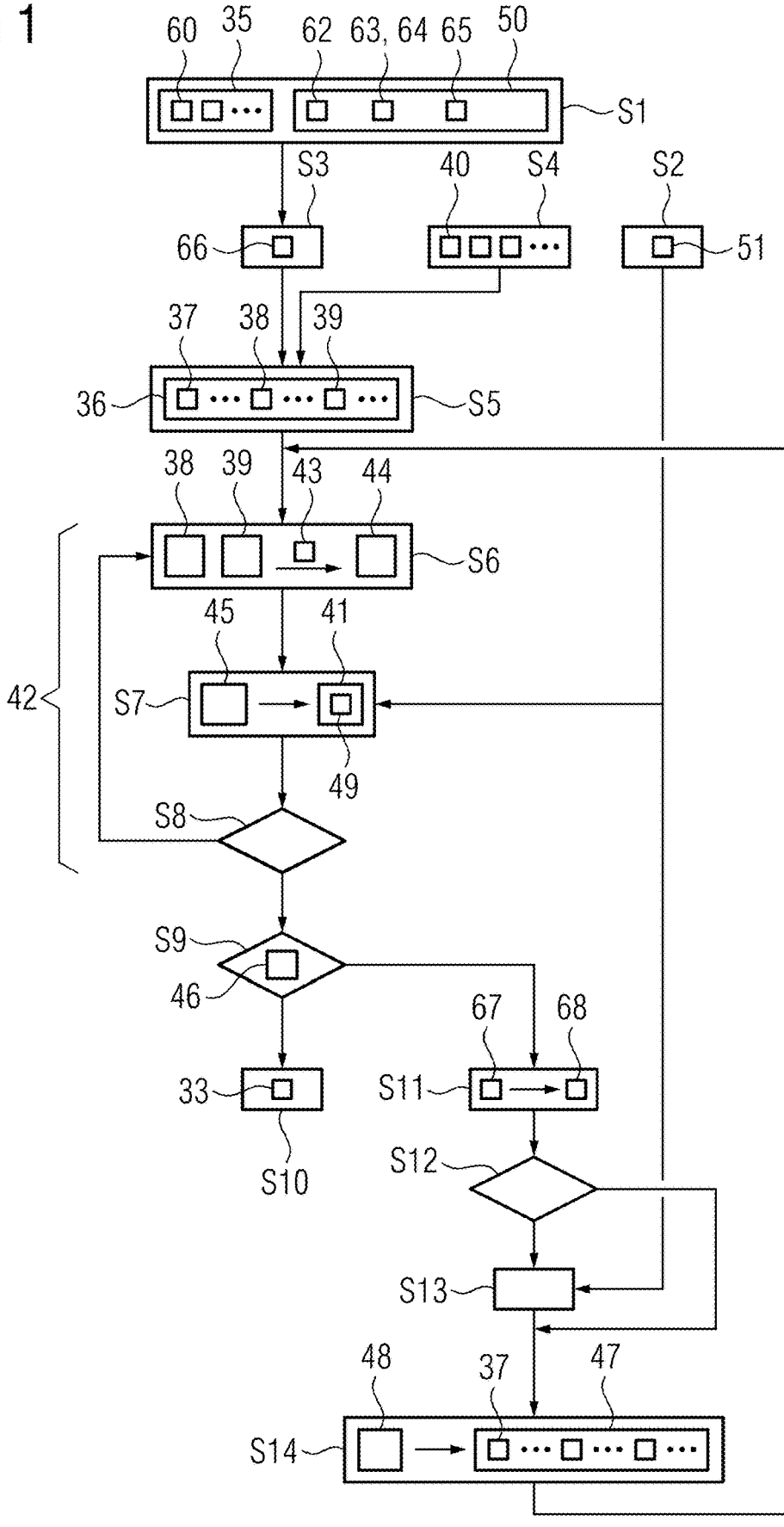
FIG. 1 depicts a flowchart of an embodiment of the method for providing an output data set.

FIG. 1 depicts a flowchart of a method for providing an output data set 33 on the basis of an input data set 35 that relates to an examination subject 34. The input data set 35 may be provided for example by a medical imaging facility 77, as is depicted by way of example in FIG. 2. In this case FIG. 2 additionally depicts an apparatus 69 for implementing the method.

As will be explained in more detail in the following, the method entails optimizing a correction, for example minimizing motion artifacts or other artifacts or interference effects in image data determined from the input data set. In the course of the optimization, intermediate data sets 37, 38, 39 generated in the process from the input data set 35 in each case in a plurality of iterations as a result of different correction operations 40 are ordered in accordance with the achieved image quality in order to adapt the corrections in a suitable manner.

Within the context of the sorting algorithm 42, a combination of the determination of a relative quality metric 44 for a pairwise comparison of multiple pairs of a respective first and second intermediate data set 38, 39 with a comparison of the quality metric 44 with a quality limit value 45 is used for this purpose. By choosing different quality limit values 45 in different iterations and/or as a result of a dependence of the quality limit value 45 on the input data set 35 or on acquisition information 50 optionally provided therewith and relating to a characteristic of the acquisition of the input data set 35, it is possible to ensure that compared to the use of a fixed quality limit value in such an optimization the probability of an optimization to an exclusively local optimum may be significantly reduced and at the same time a robust convergence of the optimization may be achieved.

In the embodiment depicted, in step S1, the input data set 35 and optionally the acquisition information 50 are received via the input interface 70. In the example depicted, they are received directly from a medical imaging facility 77. Alternatively, however, it would also be possible for example to download the input data set from a server, to retrieve it from a database or from other sources or to receive it from these.

In the example depicted, the input data set includes a plurality of partial data sets 60, specifically, for example, projection images representing a respective X-ray exposure of the examination subject 34. The partial data sets 60 were acquired at different acquisition times, thus allowing motion artifacts to be generated for example due to movement of the examination subject 34 between the acquisition times, which motion artifacts may be minimized in the explained method.

In the example, in addition to applying corrections, the correction operation 40 is also intended to include a reconstruction of a three-dimensional image data set from these projection images. It is possible in this case for only the two-dimensional image data to be corrected and/or for the reconstruction of the three-dimensional image data to be adjusted as a function of the correction.

In step S2, statistical information 51 may be provided that describes a relationship of the quality limit value 45 to be used in the sorting algorithm 42 with the false positive rate, that is equivalent to the subtraction of the selectivity from one, or with the true positive rate, i.e. the sensitivity, of the sorting of the intermediate data sets 38,39. Taking such statistical information into account in an adjustment or in the choice of the quality limit value is advantageous since this provides a maximally optimal selectivity and sensitivity to be achieved, while at the same time it may be considered with regard to the particular situation whether a selectivity or a sensitivity is more relevant in the current optimization step. A weighted sum of sensitivity and selectivity may be maximized for example. The weighting factors may be chosen according to the current situation. A possible approach to determining suitable statistical information 51 will be explained later with reference to FIG. 3.

In step S3, the quality limit value to be used later in the course of the sorting algorithm 42 may be adjusted already. A time interval 62 between the acquisition times, for example, and/or a motion metric 63 for the movement of the examination subject 34 may be compared with an acquisition limit value 66. If the limit value is exceeded, another quality limit value 45 may then be chosen that may lead for example to a higher true positive rate in the determination of the order 49 of the compared first and second intermediate data sets 38,39 than the quality limit value 45 that would be used without the limit value overshoot.

The motion metric 63 may be based for example on sensor data 64 of a sensor 79 that detects movements of the examination subject 34. The sensor depicted in FIG. 2 may be a vibration sensor, for example, or part of a position determination facility. Alternatively, or in addition, the motion metric 63 and/or the time interval 62 may also be taken from a measurement protocol 65 or be determined on the basis of the latter, that may be received as part of the acquisition information 50.

In step S4, a plurality of correction operations 40 are provided by which, when they are applied to the input data set 35 or its partial data sets 60, the intermediate data sets 37, 38,39 are generated in step S5. The intermediate data sets 37, 38,39 generated in step S5 form an initial intermediate data set group 36.

The correction operations 40 may for example all be implemented by the same correction algorithm, though the latter is parameterized differently in each case for generating the different intermediate data sets 37, 38, 39. Accordingly, the correction operations 40 may be different from one another for example exclusively in respect of the value of the at least one correction parameter. For example, different assumed motion curves may be defined for a motion correction, for example as spline curves, and their parameters and/or the assignment of different points of a motion curve to different time instants, for example a motion speed, may be varied as correction parameters in order to provide different correction operations.

The sorting algorithm 42 implemented by the following steps S6-S8 serves to order the intermediate data sets 37, 38, 39 of the initial intermediate data set group 36 or in later iterations of the modified intermediate data set group 47 according to their image quality. Since determining a relative image quality between two intermediate data sets or a relative quality metric 44 for this purpose is possible with considerably more robustness and, if a trained function is used as a comparison algorithm 43 to determine the relative quality metric, with considerably lower training overhead than determining an absolute quality metric, the sorting of the intermediate data sets 37, 38, 39 is based on a repeated pairwise comparison of different pairs of a respective first and second intermediate data set 38,39. Sorting algorithms based on pairwise comparisons are well-known.

Initially, in step S6, the comparison algorithm 43 is applied to a first and second of the intermediate data sets 38,39 in order to determine a relative quality metric 44 for this pair. For example, the relative quality metric may be all the more positive, the better the image quality of the first intermediate data set is with respect to the second intermediate data set. A negative relative quality metric 44 may indicate for example that the image quality of the first intermediate data set 38 is poorer than the image quality of the second intermediate data set 39.

However, as the relative quality metric 44 may be susceptible to error, next, in step S7, the determined relative quality metric 44 is compared with the quality limit value 45 in order to specify the order 49 of the first and second intermediate data set 38,39 in the determined quality ranking 41. If the quality limit value 45 is exceeded by the relative quality metric 44, the first intermediate data set 38 in the example is arranged ahead of the second intermediate data set 39 in the quality ranking 41.

In step S8, it is then checked whether the quality ranking 41 is already explicitly specified as a result of the preceding pairwise comparisons. If this is not the case, the method is repeated from step S6 in order to compare a further pair from a first and second intermediate data set 38,39. The choice of which first and second intermediate data sets 38,39 are compared in each case depends on the sorting algorithm used.

Following completion of the sorting of the intermediate data sets 37, 38, 39, it is checked in step S9 whether an abort condition 46 is met. In one case, the abort condition 46 may be met when a predefined number of iterations have been performed in which, in each case, as is explained later, a modified intermediate data set group 47 is generated. However, a check may be conducted for a convergence, that checks on the basis of the last used modified intermediate data set group 47 whether a convergence to an optimum has already taken place. Such a convergence may be established, for example, if the relative quality metric falls below a limit value between the first and a further, for example the last, intermediate data set in the quality ranking 41, and consequently no further significant differences in quality between the intermediate data sets may be detected.

If the abort condition 46 is met, then in step S7, in one case, the first intermediate data set in the quality ranking 41 is provided as the output data set 33. In this case the explained method already directly provides quality-optimized image data as the output data set.

However, it may also be beneficial initially to provide only the at least one correction parameter as the output data set. This enables the image processing or image reconstruction to be performed separately from the optimization of the correction operation or of the at least one correction parameter, as a result of which for example in the course of the optimization and the definitive image provision apart from the correction parameters, a different parameterization may be performed or even different algorithms may be used such that, for example, it becomes possible to use different image resolutions or voxel sizes.

If, on the other hand, the abort condition 46 is not met, then steps S11 to S14 are performed and then the method is continued from step S6.

Providing a modified intermediate data set group 47 in step S14 is central in this regard. This includes at least one intermediate data set 37 that is dependent on the quality ranking 41. In the example, the correction algorithm is parameterized with at least one modified correction parameter set in order to provide a respective modified correction operation 48 that is applied to the input data set 35 or its partial data sets 60 in order to generate a respective modified intermediate data set 37. The parametrization may be modified by the downhill simplex method. In this case a midpoint is determined in the parameter space of the correction algorithm for all the intermediate data sets except for the last intermediate data set in the order ranking and at least one modified parameter set is generated as a function of the location of the point. This method is well-known per se and therefore only a brief overview on a possible implementation for determining the modified intermediate data set group is to be given.

First, an intermediate point is determined that lies in the parameter space on the connecting line between the midpoint and the parameter set for the last intermediate data set of the order ranking. The distance of the intermediate point from the midpoint, with a predefined scaling factor that is less than one, is proportional to the distance of the midpoint from the parameter set of the last intermediate data set of the order ranking.

If a correction according to this intermediate point leads to a new intermediate data set that would be arranged between the first and last but one intermediate data set in the order ranking, the last intermediate data set is replaced by the new intermediate data set in order to form the modified intermediate data set group.

If, on the other hand, the new intermediate data set were to be arranged at the first position in the quality ranking, then an external point is determined in the parameter space that lies on the connecting line between the intermediate point and the midpoint, wherein the distance from the midpoint with a further scaling factor that is greater than one is proportional to the distance between midpoint and intermediate point. Accordingly, the external point is located relative to the midpoint of the other side of the intermediate point.

If an external intermediate data set resulting from the parameterization of the correction algorithm according to the external point were to be arranged ahead of the new intermediate data set in the order ranking, then the last intermediate data set is replaced by the external intermediate data set and otherwise the last intermediate data set is replaced by the new intermediate data set in order to form the modified intermediate data set group.

If, on the other hand, the new intermediate data set were arranged after the last but one intermediate data set in the order ranking, then if the new intermediate data set is arranged ahead of the last intermediate data set in the quality ranking, the intermediate point is chosen, and if the new intermediate data set is arranged after the last intermediate data set, the point assigned to the correction associated with the last intermediate data set in the parameter space is chosen as the reference point. A point on the connecting line between the reference point and the midpoint is then chosen as the contracted point, that preferably lies closer to the midpoint than to the reference point.

If an intermediate data set that is calculated by a correction according to the contracted point is arranged in the quality ranking ahead of the intermediate data set calculated according to the reference point, then the modified intermediate data set group is formed by replacing the last intermediate data set by the intermediate data set calculated according to the reference point.

Otherwise, all the intermediate data sets except for the first intermediate data set in the order ranking are replaced by modified intermediate data sets by conducting a correction by a respective parameterization that lies in the parameter space between the parameterization for the previous intermediate data set and the midpoint in order to form the modified intermediate data set group.

The quality limit value 45 may be chosen differently for different iterations. In one case it would be possible, for example, to change the quality limit value 45 after a predefined number of iterations in such a way that a lower false positive rate results and consequently a robust convergence is achieved.

Instead, in the example depicted, an approach is adopted in which initially, in step S11, a quality determination algorithm 67 different from the comparison algorithm 43 is used in order to determine a further, for example absolute, quality metric for at least one of the intermediate data sets 37, 38,39. Candidates for the quality determination algorithm 67 have already been discussed.

In step S12, it is then checked whether the further quality metric 68 exceeds a predefined limit value. If this is the case, the quality limit value 45 for the following iterations is changed in step S13 in such a way that a lower false positive rate results. This choice is motivated by the fact that in this case it may be assumed that a parameterization of the correction in the region of the global minimum has already been achieved as a result of the preceding iterations and consequently the actual minimum is now to be found by a higher selectivity.

If, on the other hand, the further quality metric 68 in step S12 lies below the limit value, then the same quality limit value 45 initially continues to be used in the next iterations, with the result that step S13 is skipped.

As a result of the described consideration of characteristics of the input data set 32 itself and/or of the acquisition information 50 or as a result of changing the quality limit value 45 between the iterations, an optimization to a local optimum only may generally be avoided and at the same time a robust convergence of the optimization is achieved.

Figure 2:
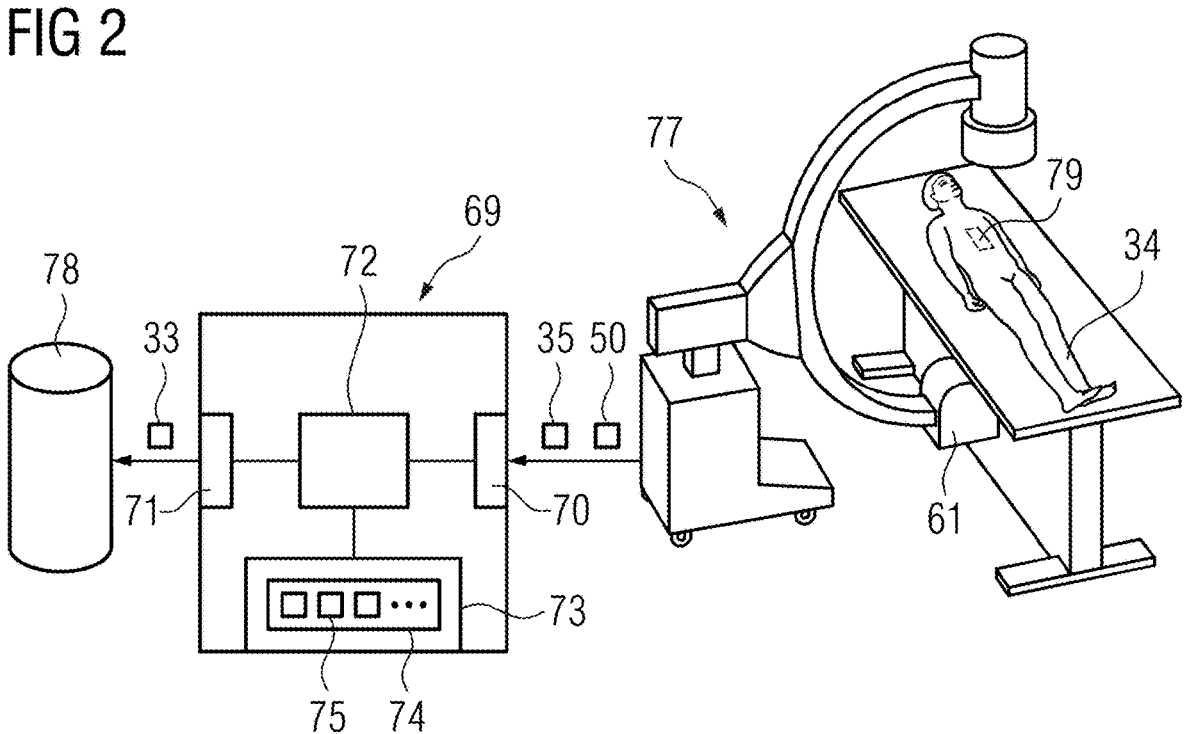
FIG. 2 depicts an embodiment of an apparatus that interacts with a medical imaging facility.

An apparatus 69 for implementing the described method is depicted in FIG. 2. In this case the apparatus includes an input interface 70 for providing the input data set 35 and optionally the acquisition data 50, an output interface 71 for outputting the output data set, and a processing facility 72 that may for example be programmable such that the steps of the method may be implemented by a computer program 74 or its instructions 75, that are stored in a memory 73 of the apparatus 69. The memory 73 may be a data medium on which the computer program 74 is permanently stored or also a volatile memory, for example a RAM memory.

In the example, the input interface 70 is connected to a medical imaging facility 77. The acquisition of the input data set 35 or of its partial data sets 60, for example of projection images, is accomplished by an acquisition means 61 which in the example is an X-ray detector. The imaging facility 77 additionally includes a sensor 79 for detecting movements of the examination subject 34.

In the example, the output data set 33 is stored in an external database 78. Alternatively, or in addition, however, the output data set 33 may also be visualized for a user, transferred to a workplace computer or the like.

In the example, the input interface 70 and the output interface 71 are represented as physical interfaces. In principle, however, the input interface 70 and the output interface 71 may also be software interfaces, for example when the input data set is provided by an internal memory of the apparatus, for example from a database stored there, or when the output data set 33 is to be further processed directly in the apparatus 69, for example is visualized there or used there in order to parameterize other processes. The further processing may for example include a processing of the input data set using the correction parameters determined as part of the output data set.

In addition, or alternatively, the apparatus 69 may also be implemented non-centrally, as a cloud solution for example.

Figure 3:
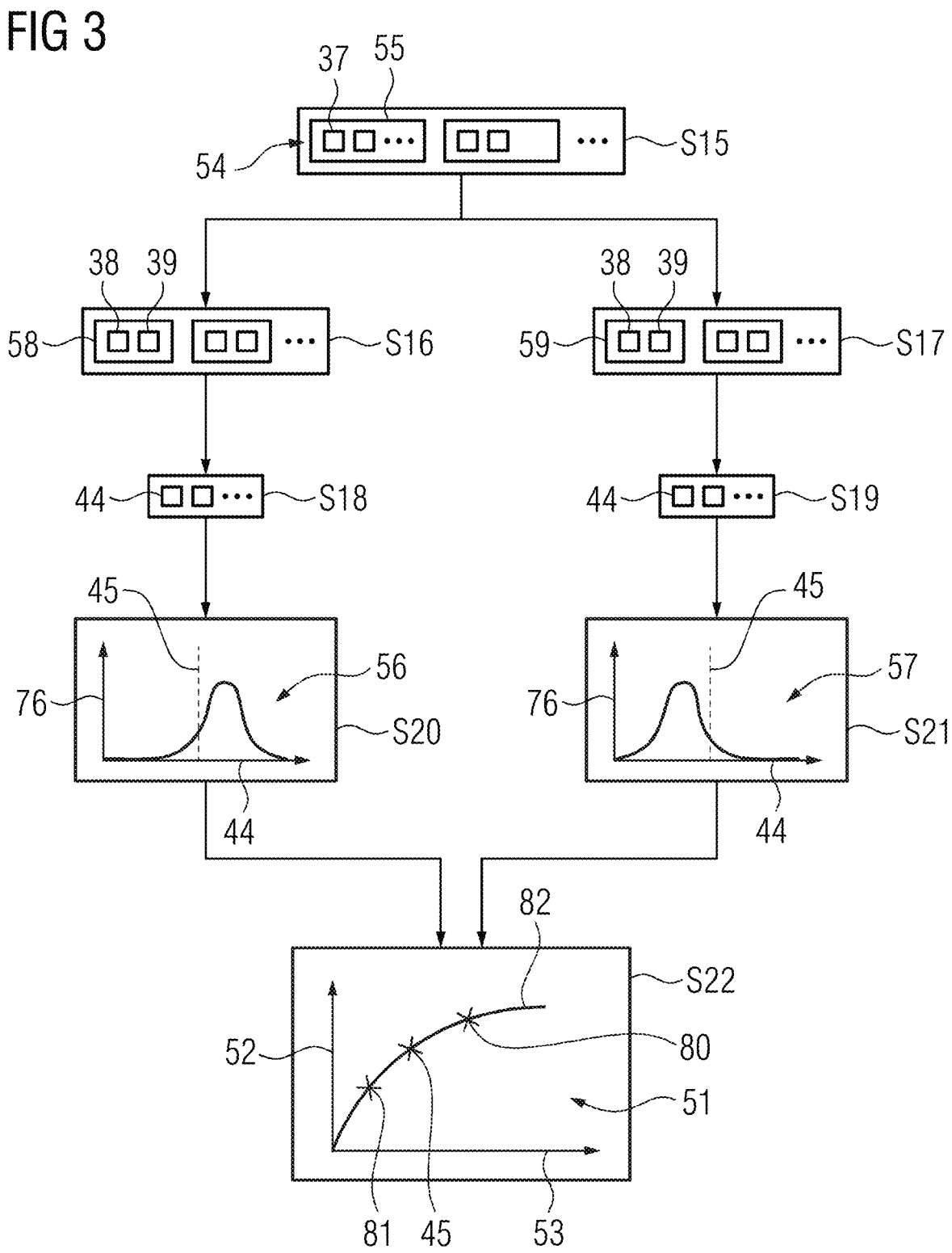
FIG. 3 depicts a flowchart of an embodiment of the method for determining the statistical information.

One possibility for determining the statistical information 41 used in the method according to FIG. 1 is explained in more detail below with reference to FIG. 3.

In step S15, reference data 54 is provided initially. The reference data 54 may be for example the same training data that was also used in a training of the comparison algorithm 43 by machine learning. Independently thereof, the individual training data sets 55 may each include a plurality of respective intermediate data sets 37 generated on the basis of the same source data, the correct quality ranking and/or an absolute measure for the image quality of the respective intermediate data set and/or reference values for relative image qualities of the possible pairs being known within the respective training data set.

Accordingly, in step S16, respective pairs of a first and second intermediate data set 38, 39 may be formed that originate from the same training data set 55 and for which it is known that the image quality of the first intermediate data set 38 is greater than the image quality of the second intermediate data set 39.

In step S17, pairs of first and second intermediate data sets 38,39 may accordingly be formed that in fact likewise originate from the same training data set 55, but in which the image quality of the first intermediate data set 38 is known to be inferior to the image quality of the second intermediate data set 39.

In steps S18 and S19, relative quality metrics 44 are determined for the pairs 58, 59 formed in steps S16 and S17 respectively, in each case by application of the comparison algorithm 43.

In step S20, a first partial statistic 56 is determined for the frequency 76 of the relative quality metrics 44 determined in step S18. A limit value 45, as used in the method according to FIG. 1 for specifying the order 49 of the respective compared intermediate data sets 38,39, is indicated in this regard in FIG. 3 by way of example. Accordingly, the part of the first partial statistic 56 to the right of the limit value 45 corresponds to the number of true positive events for the limit value 45 and the part to the left of the limit value 45 corresponds to the number of false negative events.

Accordingly, in step S21, a second partial statistic 57 is determined for the relative quality metrics 44 determined in step S19. Since it is a matter in this case of relative quality metrics 44 for pairs 59 in which the order of the first and second intermediate data set 38,39 is different to the order in the known quality ranking, that part of the second partial statistic 57 to the left of the limit value 45 corresponds to the number of true negative events and the part to the right of the limit value 45 corresponds to the number of false positive events.

A ROC curve 82, for example, may therefore be determined in step S22. As depicted schematically in FIG. 3, the false positive rate 53 is in this case plotted on the X-axis and the true positive rate 52 on the Y-axis.

The limit value 45 may be freely chosen on the ROC curve 82. It is beneficial in the event of severe sources of interference in the input data set, for example if there is a likely strong movement or a severe blurring, or in the early iteration steps, to use limit values having a high true positive rate 52, for example the limit value corresponding to point 80, in order to avoid an optimization toward an exclusively local minimum. In subsequent iteration steps or in the event of minor interference present or expected, on the other hand, a low false positive rate 53 is beneficial in order to determine the optimum with a high degree of accuracy and robustness so that, for example, the limit value corresponding to point 81 may be chosen.

An algorithm trained by machine learning may be used as the comparison algorithm 43. Simplified schematic representations of trained functions are therefore discussed below with reference to FIGS. 4 and 5, which trained functions may be used as the comparison algorithm 43 in the method.

Figure 4:
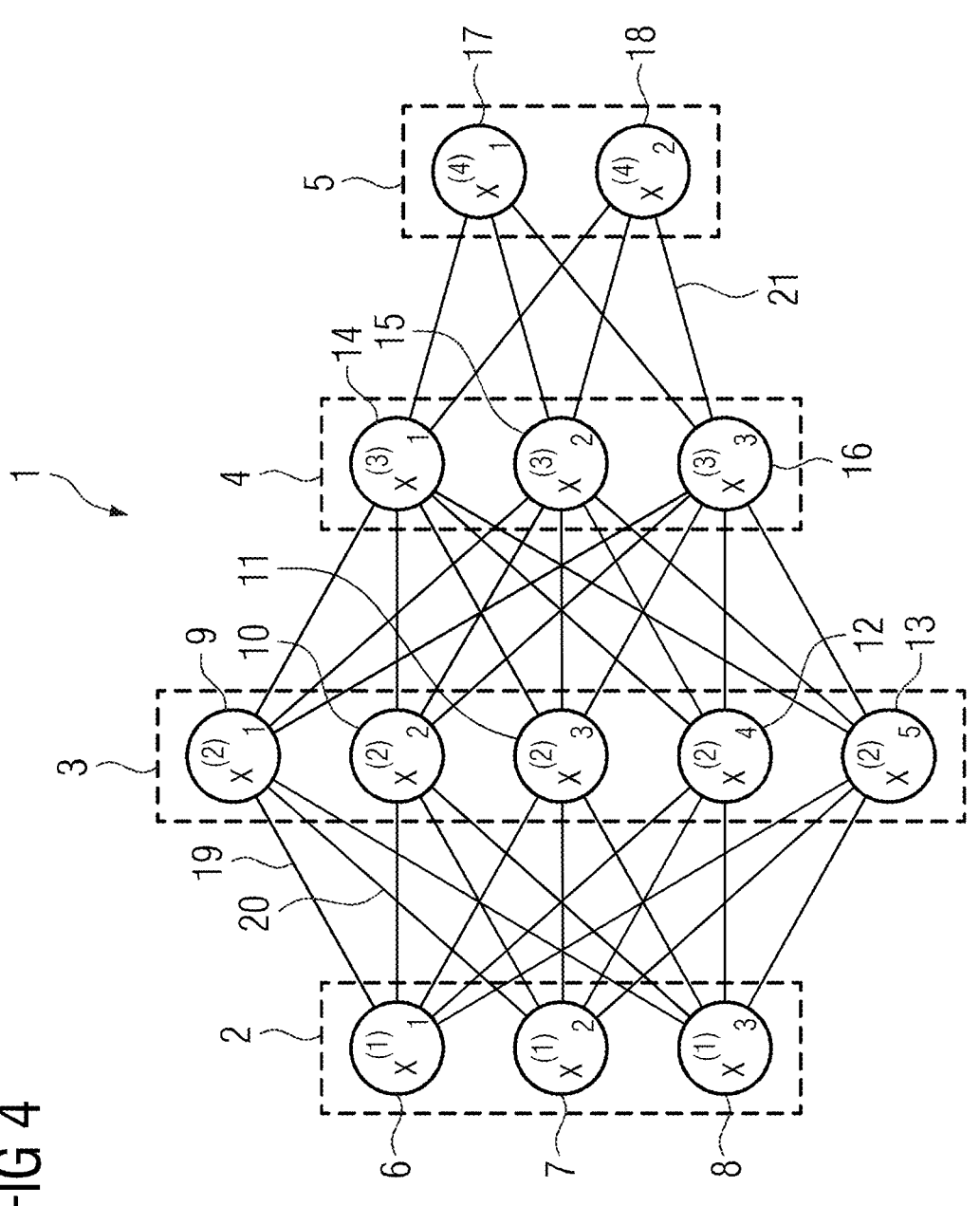
FIGS. 4 and 5 depict simplified schematic representations of trained functions that may be used as a comparison algorithm in the method according to an embodiment.

FIG. 4 depicts an embodiment of an artificial neural network 1. Alternative terms for artificial neural network 1 are "neural network", "artificial neural net" or "neural net".

Artificial neural network 1 includes nodes 6 to 18 and edges 19 to 21, wherein each edge 19 to 21 is a directed connection from a first node 6 to 18 to a second node 6 to 18. First node 6 to 18 and second node 6 to 18 may be different nodes 6 to 18, though it is also conceivable that first node 6 to 18 and second node 6 to 18 are identical. In FIG. 4, for example, edge 19 is a directed connection from node 6 to node 9 and edge 21 is a directed connection from node 16 to node 18. An edge 19 to 21 from a first node 6 to 18 to a second node 6 to 18 is referred to as an ingoing edge for second node 6 to 18 and as an outgoing edge for first node 6 to 18.

In this embodiment, nodes 6 to 18 of artificial neural network 1 may be arranged in layers 2 to 5, wherein the layers may have an intrinsic order that is introduced by edges 19 to 21 between nodes 6 to 18. For example, edges 19 to 21 may be provided only between neighboring layers of nodes 6 to 18. In the embodiment depicted, there exists an input layer 2 that includes only nodes 6, 7, 8, in each case without ingoing edge. Output layer 5 includes only nodes 17, 18, in each case without outgoing edges, with additional hidden layers 3 and 4 being located between input layer 2 and output layer 5. In the general case, the number of hidden layers 3, 4 may be chosen arbitrarily. The number of nodes 6, 7, 8 in input layer 2 typically corresponds to the number of input values into neural network 1, and the number of nodes 17, 18 in output layer 5 typically corresponds to the number of output values of neural network 1.

For example, nodes 6 to 18 of neural network 1 may be assigned a (real) number. In this case, $x^{(n)}_i$ denotes the value of the i-th node 6 to 18 of the n-th layer 2 to 5. The values of nodes 6, 7, 8 of input layer 2 are equivalent to the input values of neural network 1, whereas the values of nodes 17, 18 of output layer 5 are equivalent to the output values of neural network 1. In addition, each edge 19, 20, 21 may be assigned a weight in the form of a real number. The weight is for example a real number in the interval $[-1, 1]$ or in the interval $[0, 1,]$. In this case $w^{(m,n)}_{i,j}$ denotes the weight of the edge between the i-th node 6 to 18 of the m-th layer 2 to 5 and the j-th node 6 to 18 of the n-th layer 2 to 5. Furthermore, the abbreviation $w^{(n)}_{i,j}$ is defined for the weight $w^{(n,n+1)}_{i,j}$.

In order to calculate output values of neural network 1, the input values are propagated through neural network 1. For example, the values of nodes 6 to 18 of the (n+1)-th layer 2 to 5 are calculated based on the values of nodes 6 to 18 of the n-th layer 2 to 5 by $$x^{(n+1)}_j = f\left(\sum_i x^{(n)}_i \cdot w^{(n)}_{i,j}\right).$$

In this case $f$ is a transfer function, that may also be referred to as an activation function. Known transfer functions are step functions, sigmoid functions (for example the logistic function, the generalized logistic function, the hyperbolic tangent, the arctangent, the error function, the smoothstep function) or rectifier functions. The transfer function is essentially used for normalization purposes.

For example, the values are propagated layer by layer through neural network 1, wherein values of input layer 2 are given by the input data of neural network 1. Values of the first hidden layer 3 may be calculated based on the values of input layer 2 of neural network 1, while values of the second hidden layer 4 may be calculated based on the values in the first hidden layer 3, etc.

In order to be able to specify the values $w^{(n)}_{i,j}$ for edges 19 to 21, neural network 1 must be trained using training data. Training data includes for example training input data and training output data, designated in the following as $t_i$.

For a training step, neural network 1 is applied to the training input data in order to determine calculated output data. For example, the training output data and the calculated output data include a number of values, the number being determined as the number of nodes 17, 18 in output layer 5.

For example, a comparison between the calculated output data and the training output data is used in order to recursively adjust the weights within neural network 1 (back-propagation algorithm). For example, the weights may be varied according to $$w'^{(n)}_{i,j} = w^{(n)}_{i,j} - \gamma \cdot \delta^{(n)}_j \cdot x^{(n)}_i,$$

where $\gamma$ is a learning rate and the numbers $\delta^{(n)}_j$ may be calculated recursively as $$\delta^{(n)}_j = \left(\sum_k \delta^{(n+1)}_k \cdot w^{(n+1)}_{j,k}\right) \cdot f'\left(\sum_i x^{(n)}_i \cdot w^{(n)}_{i,j}\right)$$

based on $\delta^{(n+1)}_j$ if the (n+1)-th layer is not output layer 5, and $$\delta^{(n)}_j = \left(x^{(n+1)}_k - t^{(n+1)}_j\right) \cdot f'\left(\sum_i x^{(n)}_i \cdot w^{(n)}_{i,j}\right)$$

if the (n+1)-th layer is output layer 5, where f' is the first derivative of the activation function and $y^{(n+1)}_j$ is the comparison training value for the j-th node 17, 18 of output layer 5.

An example of a convolutional neural network (CNN) is also given below with regard to FIG. 5. It should be noted in this case that the term "layer" is employed there in a slightly different way from that in the case of classical neural networks. For a classical neural network, the term "layer" refers only to the set of nodes forming a layer, i.e. a specific generation of nodes. For a convolutional neural network, the term "layer" is often used as an object that actively modifies data, in other words as a set of nodes of the same generation and either the set of ingoing or outgoing edges.

Figure 5:
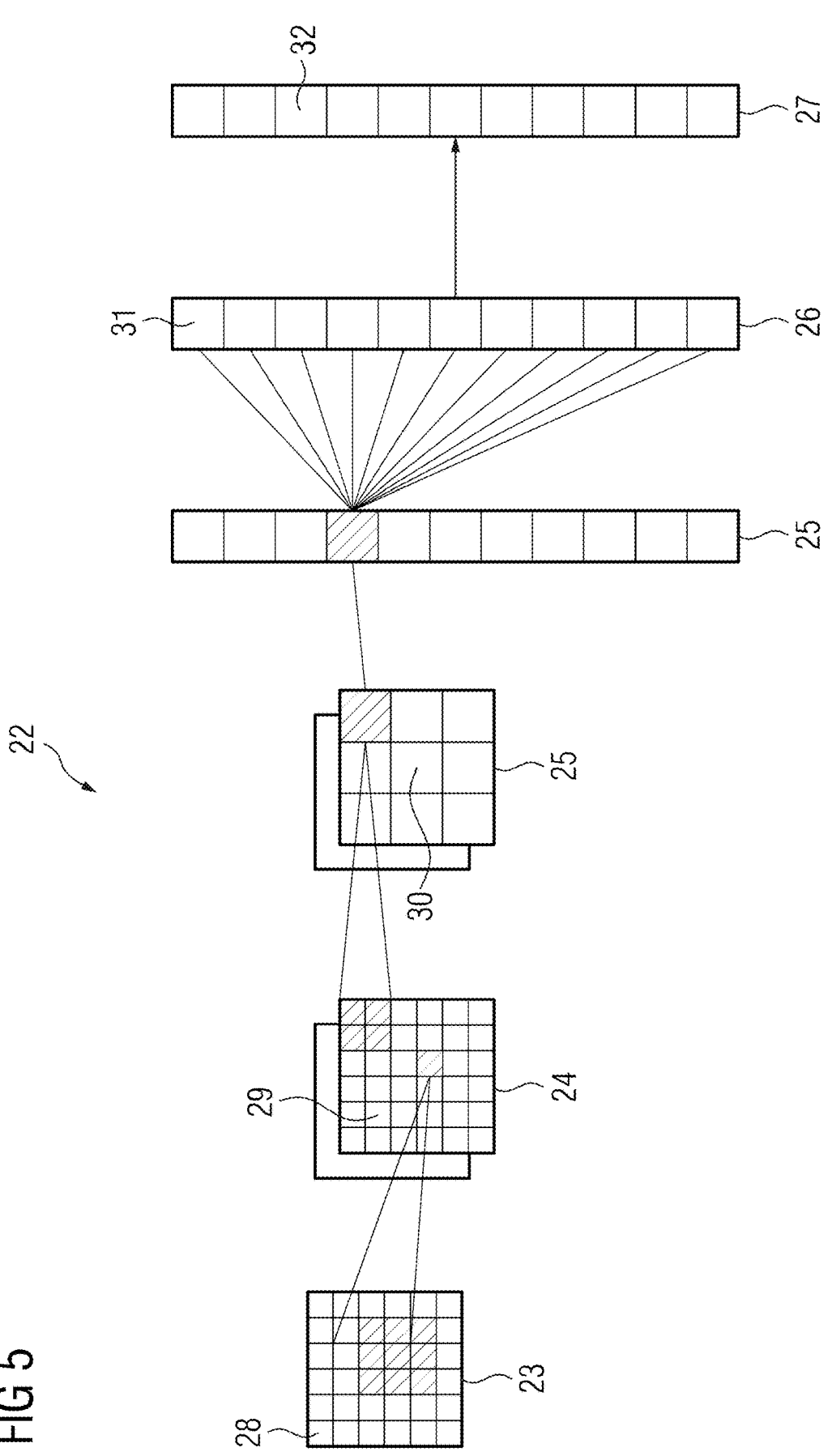

FIG. 5 depicts an embodiment of a convolutional neural network 22. In the embodiment depicted, the convolutional neural network 22 includes an input layer 23, a convolutional layer 24, a pooling layer 25, a fully connected layer 26 and an output layer 27. In alternative embodiments, convolutional neural network 22 may contain multiple convolutional layers 24, multiple pooling layers 25 and multiple fully connected layers 26, just like other types of layers. The order of the layers may be chosen arbitrarily, fully connected layers 26 typically forming the last layers before output layer 27.

For example, nodes 28 to 32 of one of layers 23 to 27 within a convolutional neural network 22 may be understood as arranged in a d-dimensional matrix or as a d-dimensional image. For example, in the two-dimensional case, the value of a node 28 to 32 having the indices i, j in the n-th layer 23 to 27 may be designated as $x^{(n)}[i,j]$. It should be pointed out that the arrangement of nodes 28 to 31 in a layer 23 to 27 has no effect whatever on the calculations performed within convolutional neural network 22 as such, since the effects are given solely by the structure and the weights of the edges.

A convolutional layer 24 is characterized for example in that the structure and the weights of the ingoing edges form a convolutional operation based on a specific number of kernels. For example, the structure and the weights of the ingoing edges may be chosen such that the values $x_k^{(n)}$ of nodes 29 of convolutional layer 24 are determined as a convolution $x_k^{(n)} = K_k * x^{(n-1)}$ based on the values $x^{(n-1)}$ of nodes 28 of the preceding layer 23, wherein the convolution * may be defined in the two-dimensional case as $$x_k^{(n)}[i, j] = \left(K_k * x^{(n-1)}\right)[i, j] = \sum_{i'} \sum_{j'} K_k[i', j'] \cdot x^{(n-1)}[i - i', j - j'].$$

Therein, the k-th kernel $K_k$ is a d-dimensional matrix, in this embodiment a two-dimensional matrix, that typically is small compared to the number of nodes 28 to 32, for example a 3×3 matrix or a 5×5 matrix. For example, this implies that the weights of the ingoing edges are not independent but are chosen such that they generate the above convolution equation. In the example of a kernel that forms a 3×3 matrix, there exist only nine independent weights (where each entry in the kernel matrix corresponds to an independent weight) regardless of the number of nodes 28 to 32 in the corresponding layer 23 to 27. For a convolutional layer 24, the number of nodes 29 in convolutional layer 24 is for example equivalent to the number of nodes 28 in the preceding layer 23 multiplied by the number of convolutional kernels.

If nodes 28 in the preceding layer 23 are arranged as a d-dimensional matrix, using the plurality of kernels may be understood as the addition of a further dimension, that is also referred to as the depth dimension, such that nodes 29 of convolutional layer 24 are arranged as a (d+1)-dimensional matrix. If nodes 28 of the preceding layer 23 are already arranged as a (d+1)-dimensional matrix having a depth dimension, the use of a plurality of convolutional kernels may be understood as an expansion along the depth dimension, such that nodes 29 of convolutional layer 24 are likewise arranged as a (d+1)-dimensional matrix, the size of the (d+1)-dimensional matrix in the depth dimension being greater by the factor formed by the number of kernels than in the preceding layer 23.

The advantage of using convolutional layers 24 is that the spatially local correlation of the input data may be made use of by creating a local connectivity pattern between nodes of neighboring layers, for example in that each node has connections only to a small section of the nodes of the preceding layer.

In the embodiment depicted, input layer 23 includes thirty-six nodes 28, that are arranged as a two-dimensional 6×6 matrix. Convolutional layer 24 includes seventy-two nodes 29, that are arranged as two two-dimensional 6×6 matrices, each of the two matrices being the result of a convolution of the values of input layer 23 with a convolutional kernel. In the same way, nodes 29 of convolutional layer 24 may be understood as arranged in a three-dimensional 6×6×2 matrix, the last-cited dimension being the depth dimension.

A pooling layer 25 is characterized in that the structure and the weights of the ingoing edges and the activation function of its nodes 30 define a pooling operation based on a nonlinear pooling function $f$. In the two-dimensional case, for example, the values $x^{(n)}$ of nodes 30 of pooling layer 25 may be calculated based on the values $x^{(n+1)}$ of nodes 29 of the preceding layer 24, as follows:

$$x^{(n)}[i, j] = f\left(x^{(n-1)}[id_1, jd_2], \ldots, x^{(n-1)}[id_1 + d_1 - 1, jd_2 + d_2 - 1]\right).$$

In other words, by using a pooling layer 25 it is possible to reduce the number of nodes 29, 30 by replacing a number of $d_1 \times d_2$ neighboring nodes 29 in the preceding layer 24 by a single node 30 that is calculated as a function of the values of the cited number of neighboring nodes 29. The pooling function $f$ may be for example a maximum function, an averaging or the L2 norm. For example, the weights of the ingoing edges may be specified for a pooling layer 25 and cannot be modified by training.

The advantage of using a pooling layer 25 is that the number of nodes 29, 30 and the number of parameters are reduced. This leads to a reduction in the computational load required within convolutional neural network 22 and consequently to a control of the overfitting.

In the embodiment depicted, pooling layer 25 is a max pooling layer in which four neighboring nodes are replaced by just a single node, the value of which is formed by the maximum of the values of the four neighboring nodes. The max pooling operation is applied to each d-dimensional matrix of the previous layer; in this embodiment, the max pooling operation is applied to each of the two two-dimensional matrices, as a result of which the number of nodes is reduced from seventy-two to eighteen.

A fully connected layer 26 is characterized in that a majority, for example all, of the edges between nodes 30 of the previous layer 25 and nodes 31 of the fully connected layer 26 are present, wherein the weight of each of the edges may be adjusted individually. In this embodiment, nodes 30 of the preceding layer 25 and of the fully connected layer 26 are depicted both as two-dimensional matrices and in addition as non-related nodes (represented as a line of nodes, where the number of nodes has been reduced to provide better clarity of illustration). In this embodiment, the number of nodes 31 in the fully connected layer 26 is equal to the number of nodes 30 in the preceding layer 25. The number of nodes 30, 31 may be different in alternative embodiment variants.

In this embodiment, the values of nodes 32 of output layer 27 are furthermore determined by applying the softmax function to the values of nodes 31 of the preceding layer 26. As a result of applying the softmax function, the sum of the values of all nodes 32 of output layer 27 is one, and all the values of all nodes 32 of the output layer are real numbers between 0 and 1. When convolutional neural network 22 is used for classifying input data, the values of output layer 27 for example may be interpreted as the probability that the input data falls into one of the different classes.

A convolutional neural network 22 may also contain a ReLU layer, where ReLU stands as an acronym for "rectified linear units". For example, the number of nodes and the structure of the nodes within a ReLU layer is equivalent to the number of nodes and the structure of the nodes in the preceding layer. The value of each node in the ReLU layer may be calculated for example by applying a rectifier function to the value of the corresponding node of the preceding layer. Examples of rectifier functions are f(x) =max(0,x), the hyperbolic tangent function or the sigmoid function.

Convolutional neural networks 22 may be trained for example based on the backpropagation algorithm. Regularization methods may be used in order to avoid overfitting, for example dropout of individual nodes 28 to 32, stochastic pooling, use of artificial data, weight decay based on the L1 or L2 norm, or max norm constraints.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that the dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for providing an output data set based on an input data set relating to an examination subject, the method comprising:

receiving the input data set relating to the examination subject;

generating an initial intermediate data set group from a plurality of intermediate data sets by applying different correction operations associated with each of the plurality of intermediate data set to the input data set, wherein the correction operations comprises one of correcting motion artifacts, metal artifacts or artifacts on the basis of high-contrast regions, beam hardening artifacts and/or scatter artifacts, a contrast optimization, or a sharpness optimization;

ordering the plurality of intermediate data sets according to a quality ranking in respect of their image quality by a sorting algorithm, wherein the intermediate data sets of the initial intermediate data set group are ordered in a first iteration of a plurality of iterations, wherein, in the sorting algorithm, a relative quality metric is determined for an image quality of a first intermediate data set of the intermediate data sets in relation to a second intermediate data set of the intermediate data sets by a comparison algorithm, after which the order of the first intermediate data set and the second intermediate data set in the quality ranking is specified by a comparison of the quality metric with a quality limit value, wherein quality limit values different from one another are used in the sorting algorithm in at least two iterations and/or wherein the quality limit value is specified in at least one iteration of the plurality of iterations as a function of the input data set and/or of acquisition information relating to at least one characteristic of the acquisition of the input data set;

forming a modified intermediate data set group that comprises at least one intermediate data set which is generated by applying a correction operation dependent on the quality ranking to the input data set, wherein after which, in a further iteration of the plurality of iterations, the ordering of the intermediate data sets are repeated; and selecting, after a predefined number of iterations have been performed or a convergence to an optimum has occurred, wherein the convergence may be established if the relative quality metric falls below a limit value between the first and a last intermediate data set in the quality ranking and consequently no further differences in quality between the first and last intermediate data sets may be detected, one of the intermediate data sets as a function of the quality ranking and at least one correction parameter which parameterizes a correction algorithm in order to provide the correction operation associated with the selected intermediate data set and/or the selected intermediate data set are provided as the output data set.

2. The computer-implemented method of claim 1, wherein the quality limit value is specified for at least one of the plurality of iterations as a function of statistical information which describes a relationship of a true positive rate and/or of a false positive rate of the determined order of the first intermediate data set and the second intermediate data set with respect to the limit value for predefined reference data.

3. The computer-implemented method of claim 2, wherein statistical information based on a first partial statistic and a second partial statistic is used as the statistical information, wherein the first partial statistic and the second partial statistic in each case describes a frequency distribution of the relative quality metrics when the comparison algorithm is applied to pairs of a first intermediate data set and the second intermediate data set predefined by the reference data, wherein in the case of the first partial statistic the intermediate data sets of the respective pair are selected from the reference data in such a way that the image quality of the first intermediate data set is higher than the image quality of the second intermediate data set, and wherein in the case of the second partial statistic the intermediate data sets are selected from the reference data in such a way that the image quality of the first intermediate data set is lower than the image quality of the second intermediate data set.

4. The computer-implemented method of claim 2, wherein the statistical information is or describes a ROC curve that describes the relationship between the true positive rate and the false positive rate.

5. The computer-implemented method of claim 2, wherein the limit value is chosen in the plurality of iterations in such a way that for at least one of the iterations of the plurality of iterations the true positive rate and/or the false positive rate is less than in at least one preceding iteration of the plurality of iterations.

6. The computer-implemented method of claim 2, wherein the input data set comprises a plurality of partial data sets acquired at acquisition times spaced apart from one another in time, wherein the correction operation is or comprises an at least partial compensation for a respective assumed relative movement between the examination subject and an acquisition by which the partial data sets were acquired.

7. The computer-implemented method of claim 6, wherein the acquisition information specifies a time interval between at least two of the acquisition times and/or a motion metric for a movement of the examination subject, wherein the limit value is specified in at least one of the iterations of the plurality of iterations as a function of the time interval and/or of the motion metric.

8. The computer-implemented method of claim 7 characterized in that when an acquisition limit value is reached or exceeded by the motion metric and/or by the time interval, the quality limit value is chosen in at least one of the iterations such that the true positive rate and/or the false positive rate is greater than for a case in which the acquisition limit value is not reached or exceeded.

9. The computer-implemented method of claim 1, wherein the acquisition information is based at least to some extent on sensor data acquired during the acquisition of the input data set and/or on a measurement protocol used for the acquisition of the input data set.

10. The computer-implemented method of claim 1, wherein for at least one of the iterations of the plurality of iterations, a further quality metric is determined by a quality determination algorithm different from the comparison algorithm for at least one of the intermediate data sets of the modified intermediate data set group in this iteration or in the iteration preceding this iteration, wherein the quality limit value used in this iteration is dependent on the further quality metric.

11. The computer-implemented method of claim 1, wherein a function trained by machine learning is used as the comparison algorithm.

12. The computer-implemented method of claim 1, further comprising:

determining statistical information for specifying a quality limit value for at least one of the iterations of the plurality of iterations as a function of the statistical information, wherein a first partial statistic and a second partial statistic are determined by in each case determining a frequency distribution of the relative quality metrics when the comparison algorithm is applied to pairs of the first intermediate data set and the second intermediate data set predefined by reference data, wherein in the case of the first partial statistic the intermediate data sets are selected from the reference data in such a way that the image quality of the first intermediate data set is higher than the image quality of the second intermediate data set, and wherein in the case of the second partial statistic the intermediate data sets are selected from the reference data in such a way that the image quality of the first intermediate data set is lower than the image quality of the second intermediate data set, after which the statistical information is provided as a function of the first partial statistic and the second partial statistic.

13. An apparatus comprising:

an input interface via which an input data set is received;

an output interface via which an output data set is provided; and a processing facility configured to:

generate an initial intermediate data set group from a plurality of intermediate data sets by applying a respective correction operation associated with each respective intermediate data set to the input data set, wherein the correction operation comprises one of correcting motion artifacts, metal artifacts or artifacts on the basis of high-contrast regions, beam hardening artifacts and/ or scatter artifacts, a contrast optimization, or a sharpness optimization;

order the plurality of intermediate data sets according to a quality ranking in respect of their image quality by a sorting algorithm, wherein the intermediate data sets of the initial intermediate data set group are ordered in a first iteration of a plurality of iterations, wherein, in the sorting algorithm, a relative quality metric is determined for an image quality of a first intermediate data set of the intermediate data sets in relation to a second intermediate data set of the intermediate data sets by a comparison algorithm, after which the order of the first intermediate data set and the second intermediate data set in the quality ranking is specified by a comparison of the quality metric with a quality limit value, wherein quality limit values different from one another are used in the sorting algorithm in at least two iterations and/or wherein the quality limit value is specified in at least one iteration of the plurality of iterations as a function of the input data set and/or of acquisition information relating to at least one characteristic of the acquisition of the input data set;

form a modified intermediate data set group that comprises at least one intermediate data set which is generated by applying a correction operation dependent on the quality ranking to the input data set, after which, in a further iteration of the plurality of iterations, the ordering of the intermediate data sets are repeated; and select, after a predefined number of iterations have been performed or a convergence to an optimum has occurred, wherein the convergence may be established if the relative quality metric falls below a limit value between the first and a last intermediate data set in the quality ranking and consequently no further differences in quality between the first and last intermediate data sets may be detected, one of the intermediate data sets as a function of the quality ranking and at least one correction parameter which parameterizes a correction algorithm in order to provide the correction operation associated with the selected intermediate data set and/ or the selected intermediate data set are provided as the output data set.

14. A non-transitory computer implemented storage medium that stores machine-readable instructions executable by at least one processor for providing an output data set based on an input data set relating to an examination subject, the machine-readable instructions comprising:

receiving the input data set;

generating an initial intermediate data set group from a plurality of intermediate data sets by applying a correction operation associated with an intermediate data set to the input data set;

ordering the plurality of intermediate data sets according to a quality ranking in respect of their image quality by a sorting algorithm, wherein the intermediate data sets of the initial intermediate data set group are ordered in a first iteration of a plurality of iterations, wherein, in the sorting algorithm, a relative quality metric is determined for a relative image quality of a first intermediate data set of the intermediate data sets in relation to a second intermediate data set of the intermediate data sets by a comparison algorithm, after which the order of the respective first intermediate data set and second intermediate data set in the quality ranking is specified by a comparison of the relative quality metric with a quality limit value, wherein quality limit values that are different from one another are used in the sorting algorithm in at least two iterations and/or wherein the quality limit value is specified in at least one iteration of the plurality of iterations as a function of the input data set and/or of acquisition information relating to at least one characteristic of the acquisition of the input data set;

forming a modified intermediate data set group that comprises at least one intermediate data set which is generated by applying a correction operation dependent on the quality ranking to the input data set, after which, in a further iteration of the plurality of iterations, the ordering of the intermediate data sets are repeated;

selecting, after a predefined number of iterations have been performed or a convergence to an optimum has occurred, wherein the convergence may be established if the relative quality metric falls below a limit value between the first and a last intermediate data set in the quality ranking and consequently no further differences in quality between the first and last intermediate data sets may be detected when an abort condition is met, one of the intermediate data sets as a function of the quality ranking and at least one correction parameter which parameterizes a correction algorithm in order to provide the correction operation associated with the selected intermediate data set and/or the selected intermediate data set are provided as the output data set.

\* \* \* \* \*